(12) United States Patent
Mackiewicz

(10) Patent No.: US 7,086,505 B2
(45) Date of Patent: Aug. 8, 2006

(54) DISC BRAKE

(75) Inventor: John Edmund Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 10/905,022

(22) Filed: Dec. 10, 2004

(65) Prior Publication Data

US 2006/0124403 A1    Jun. 15, 2006

(51) Int. Cl.
F16D 55/14    (2006.01)

(52) U.S. Cl. ................. 188/72.2; 188/72.6; 188/73.46; 188/250 D

(58) Field of Classification Search ............... 188/71.1, 188/72.2, 72.6, 73.31, 73.39, 73.46, 73.47, 188/219.1, 233.3, 233.7, 250 D, 250 C, 250 F, 188/250 B, 73.44, 73.45
See application file for complete search history.

(56) References Cited

U.S. PATENT DOCUMENTS

| | | | |
|---|---|---|---|
| 3,113,643 A | 12/1963 | Botterill | |
| 3,465,849 A * | 9/1969 | Bernfeld et al. ........... | 188/72.6 |
| 3,900,083 A * | 8/1975 | Hauth ....................... | 188/72.2 |
| 4,155,431 A * | 5/1979 | Johnson .................... | 188/72.6 |
| 4,222,466 A | 9/1980 | Brimaud | |
| 4,530,423 A | 7/1985 | Ritsema | |
| 4,591,028 A | 5/1986 | Hagiwara et al. | |
| 6,000,506 A | 12/1999 | Warwick | |
| 6,454,056 B1 | 9/2002 | Iida | |

FOREIGN PATENT DOCUMENTS

| | | | |
|---|---|---|---|
| DE | 1019873 | * | 11/1957 |
| JP | 08326800 A | * | 12/1996 |
| JP | 09042331 A | * | 2/1997 |

* cited by examiner

*Primary Examiner*—Thomas Williams
(74) *Attorney, Agent, or Firm*—Leo H McCormick, Jr.; Sarah Taylor

(57) ABSTRACT

A disc brake has a support with a first end separated from a second end by first and second side walls that retain actuation members to move the first and second friction members into engagement with a rotor and effect a brake application. First and second perpendicular projections that extend from the support are aligned with the first wall and third and fourth perpendicular projections that extend from the support and are aligned with the second wall. The first and second friction members have first and second radial projections located between a first end and a second end. Beams connect the radial projections with the perpendicular projections to align the first and second friction members with the rotor and pivot on the perpendicular projections to carry reaction forces created during a brake application into the first end of the support.

17 Claims, 3 Drawing Sheets

DISC BRAKE

DESCRIPTION

This invention relates to a disc brake wherein carriers for first and second friction members each have first and second radial projections that are connected to a fixed support and carry a reaction force that is modified by a servo action force into the fixed support during a brake application.

BACKGROUND OF THE INVENTION

In disc brakes, it is common for a caliper to straddle a rotor that is fixed to an axle of a vehicle with the caliper is fixed to a yoke that is secured to the housing of the vehicle. The caliper has a bore therein that retains an actuation piston to define an actuation chamber. A first friction member is connected to the actuation piston while a second friction member is connected to an arm that extends from the caliper. The first and second friction members are located on opposite sides of the rotor and when pressurized fluid is supplied to the actuation chamber, the piston and caliper move in opposite directions such that the first and second friction members engage the rotor to effect a brake application. The following U.S. patents may be considered as illustrative of such disc brake and their corresponding functional operation: U.S. Pat. Nos. 3,113,643; 4,530,423; 6,000,506 and 6,454,056. While all of the disc brakes disclosed by these patents have certain differences they function in a manner as describe above wherein the friction members and the caliper slide on either pins or rails during a brake application. Unfortunately such sliding can often results in high friction forces that must be overcome before and during the movement of the friction members into engagement with a rotor to effect a brake application. It is understood that elimination or a reduction of sliding friction forces would allow that portion of an actuation force to be directed to the development of a brake force and as a result the size of a caliper and weight of a brake may be reduced. The disc brake disclosed in U.S. Pat. Nos. 4,155,431; 4,222,466 and 4,591,028 teaches the use of yokes and levers to move friction pads into engagement with a rotor without introducing of sliding friction but the complexity of such linkage toggle arrangements have not received wide acceptance in the manufacture of disc brakes.

SUMMARY OF THE INVENTION

The present invention provides a disc brake with an actuation arrangement whereby the friction members are held in axial alignment with a rotor by beams that extend from a support and pivot with respect to the support as the friction members are moved into engagement with a rotor to effect a brake application.

In more particular detail the disc brake of the present invention includes a support member having a substantially rectangular body with a corresponding rectangular opening therein to define a first end that is separated from a second end by parallel first and second side walls. The first end has first and second perpendicular projections thereon that are aligned with the first wall and third and fourth perpendicular projections thereon that are aligned with the second wall. The support member is fixed to a housing of a vehicle to locate the first and second walls in parallel alignment corresponding first and second faces on a rotor. The first wall has a first plurality of bores therein for receiving a first plurality of piston to define a first plurality of chambers while the second wall has a second plurality of bores therein for receiving a second plurality of pistons to define a second plurality of chambers. The first and second plurality of chambers are connected to receive pressurized fluid from a source. A first friction member that has a carrier plate with a first and second radial projections thereon located mid-way between a first end and a second end is aligned with the first plurality of pistons by linkage that included a first beam pivotally attached to the first perpendicular projection and a second beam pivotally attached to the second perpendicular projection on the first end. Similarly, a second friction member that has a carrier plate with a first and second radial projections thereon located mid-way between a first end and a second end is aligned with the second plurality of pistons by linkage that includes a third beam pivotally attached to the third perpendicular projection and a fourth beam pivotally attached to the fourth projection on the first end. On the communication of pressurized fluid to the first and second plurality of chambers, the pressurized fluid acts on the first and second plurality of pistons to create an actuation force that simultaneously move the first friction member into engagement with a first face on the rotor and the second friction member into engagement with a second face on the rotor to effect a brake application. On engagement of the first and second friction members with the rotor, a reaction force is produced that is carried through the first and second radial projections into the first, second, third and fourth beams into the corresponding perpendicular projections to oppose the rotation of the rotor. With the perpendicular projections offset from the first and second radial projections on the friction members, a portion of the reaction force that is received by the first and second radial projections rather than being transmitted into the first end is redirected back into and added to the actuation force to effect the brake application. Thus, it would be possible to reduce the size of pistons and support member and yet provide the same braking capability or using a same side to provide for an increased braking capability.

An advantage of the invention is in the elimination of a need to overcome sliding friction of a friction member when being moved into engagement with a rotor to effect a brake application.

DETAILED DESCRIPTION

In the specification where similar components are used the component may be identified by a number or a same number plus ' depending on a relationship with other components.

Figure 1:
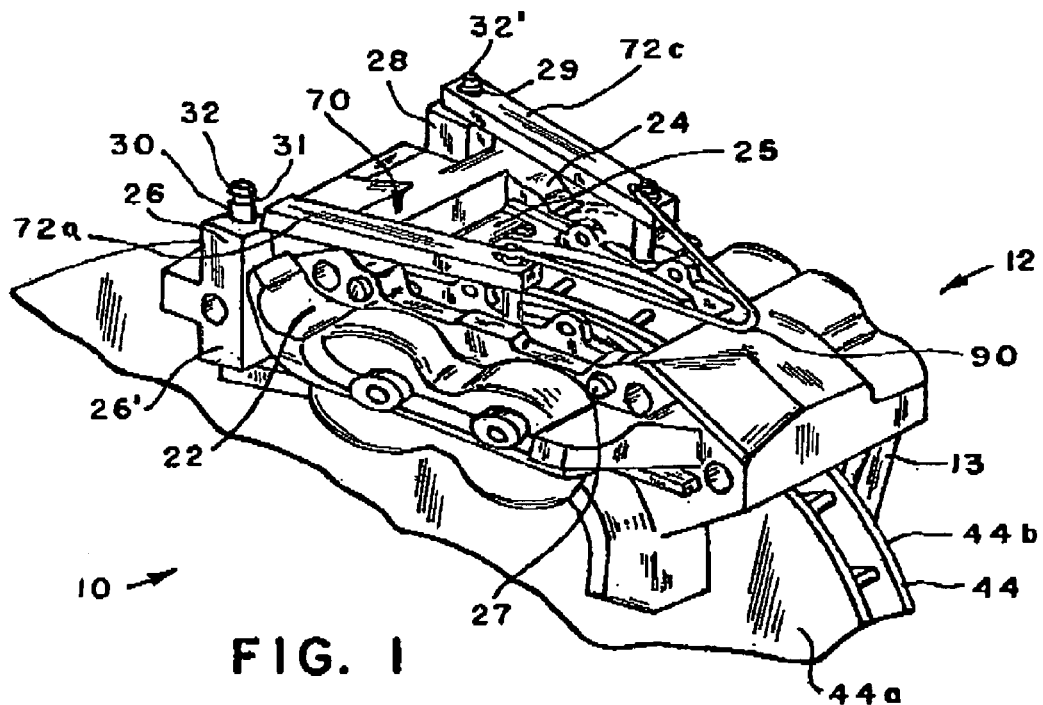
FIG. 1 is a front perspective view of a disc brake and rotor according to the present invention.

The disc brake 10 shown in FIG. 1 is made according to the present invention and is fixed to a wheel or axle support 13 for a vehicle by bolts that extend through openings 14, 14' in caliper 12 to transmit braking forces into the support 13 during a brake application. The caliper 12 functions as a support for retaining the other components of disc brake 10 in a desired relationship with respect to a rotor 44 that is associated with a wheel for a vehicle.

The caliper or support member 12 is integrally cast and has a substantially rectangular body with a corresponding rectangular opening 16 therein to define a first end 18 that is separated from a second end 20 by parallel first 22 and second 24 side walls. The first end 18 has first 26 and second 26' perpendicular projections thereon that are aligned with the first wall 22 and third 28 and fourth 28' perpendicular projections thereon that are aligned with the second wall 24, see FIGS. 2 and 3. The first 26 and second 26' perpendicular projections and third 28 and fourth 28' perpendicular projections are all identical and each has a round bearing surface 30 with groove 31 that is located adjacent the end 32. The support member 12 is fixed to the housing of the vehicle to position the first 22 and second 24 walls in parallel alignment with corresponding first 44a and second 44b faces on rotor 44. The first wall 22 has first 34 and second 34' bores for receiving first 36 and second 36' pistons to define first 38 and second 38' chamber while the second wall 24 also has first 34a and second 34'a bores therein for receiving first 36a and second 36a' pistons to define first 38a and second 38a' chambers. The first 38,38a and second 38',38'a chambers are selectively connected to simultaneously receive pressurized fluid from a source through openings 39,39',39a and 39a' that is under the control of the operator during a brake application.

Figure 4:
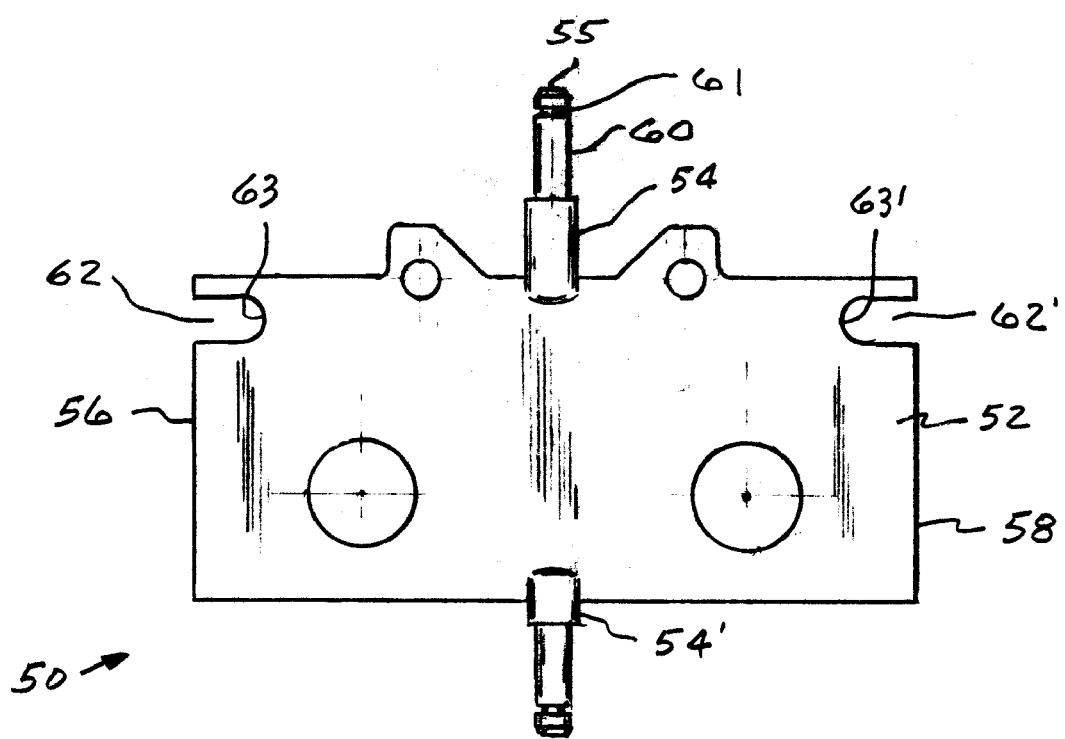
FIG. 4 is a side view of a carrier for a friction member for use in the disc brake of FIG. 1.

The support member or caliper 12 is designed to receive first 50 and second 50' friction members each of which is distinguished by carrier plate 52 having a first 54 and a second 54' radial projection thereon that is located mid-way between a first end 56 and a second end 58 and a slot 62 adjacent the first end 56 and a slot 62' adjacent the second end 58, see FIG. 4. The radial projections 54, 54' each have a cylindrical shape that define a bearing surface 60 and a groove 61 that is located adjacent the end 55 thereof.

The first 50 and second 50' friction members are positioned within the rectangular 16 of support member 12 by linkage 70 that is connected to the first end 18 of the caliper or support member 12.

Figure 2:
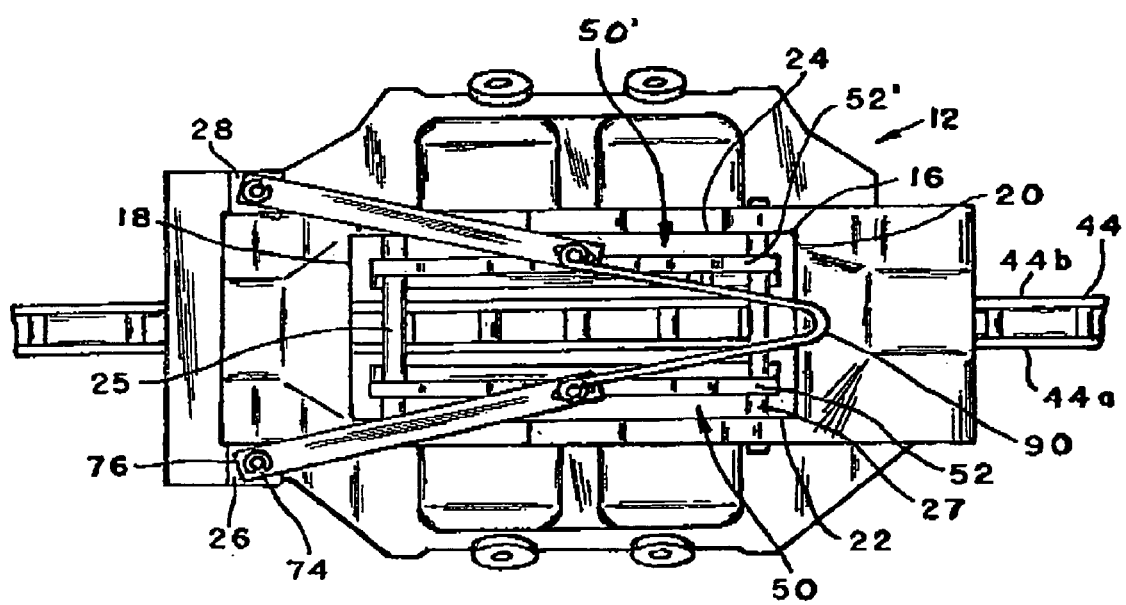
FIG. 2 is a top view of the disc brake of FIG. 1.
Figure 3:
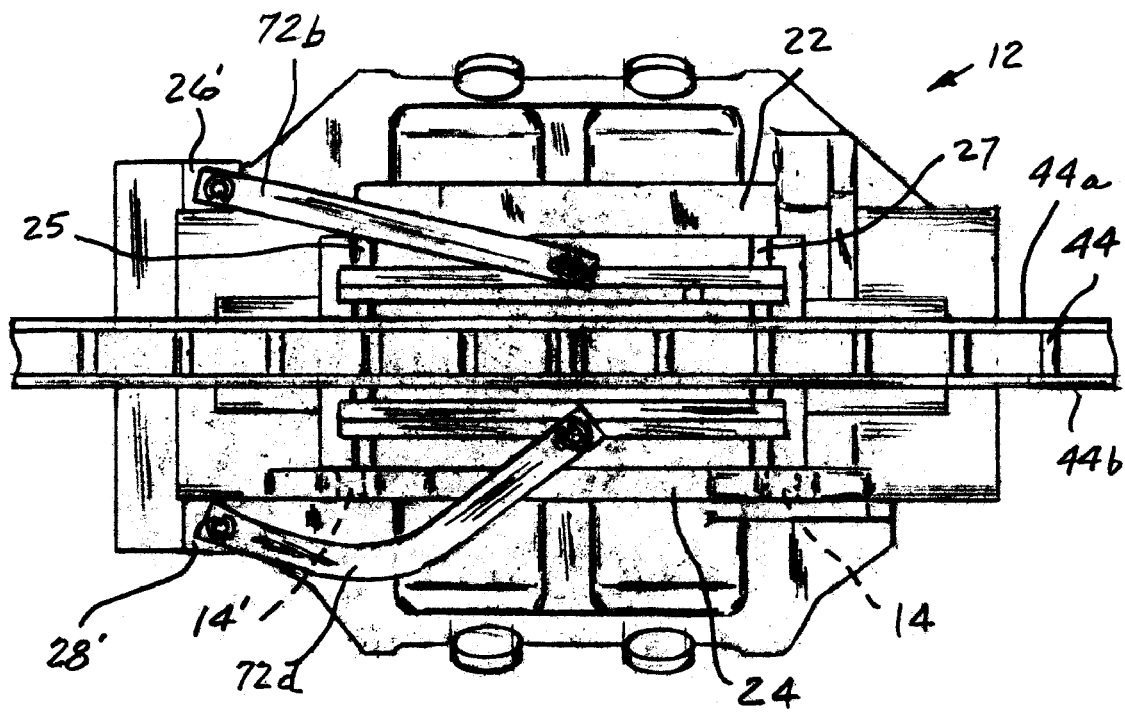
FIG. 3 is a bottom view of the disc brake of FIG. 1.

The linkage 70 is distinguished by identical straight rectangular beams 72a, 72b and 72c and curved beam 72d (the curved beam be necessary to avoid interference with mounting surface surrounding opening 14' in support 12), see FIG. 3, each of which have an circular opening 74 on a first end 76 that is positioned on bearing surface 30 on a perpendicular projection on the first end 18 and an oval or elongated opening 78 on a second end 79 that is positioned on bearing surface on a radial projection 54 of a carrier plate 52. Specifically, rectangular beams 72a and 72b are respectively connected to projections 54-26 and 54'-26' to align the first friction member 50 on a first side 44a of rotor while beams 72c and 72d are respectively connected to projections 54a-26a; and 54a'-26a' to align the second friction member 50' on a second side 44b of rotor 44, see FIGS. 2 and 3.

A spreader spring 90 is attached to the first 50 and second 50' friction members to urge the friction members to a position of rest and define a running clearance with respect to the rotor 44.

METHOD OF ASSEMBLY OF THE DISC BRAKE

The disc brake 10 may be assembled through the following steps:

obtaining a support member 12 having a substantially rectangular body with a corresponding rectangular opening 16 that defines a first end 18 and a second end 20 separated by parallel first 22 and second 24 side walls from a source, the first end being distinguished by first 26 and second 26' perpendicular projections thereon that are aligned with the first wall 22 and third 26a and fourth 26a' perpendicular projections thereon that are aligned with the second wall 24, each of the perpendicular projections having a bearing surface 30 with a groove 31 located adjacent a top 32, the first wall is further distinguished by first 34 and second 34' bores that correspondingly retain first 36 and second 36' pistons to define first 38 and second 38' chambers;

obtaining identical first 50 and second 50' friction members from a source, each friction member 50,50' being distinguished by a carrier plate 52 having a first end 56 and a second end 58 with a first radial projection 54 extending from a top face midway from the first 56 and second ends 58 and a second radial projection 54' extending from a bottom face midway from the first 56 and second ends 58; and a first axial slot 62 adjacent the first end 56 and a second axial slot 62' adjacent the second end 58;

placing the first 50 and second 50' friction members in the rectangular opening 16;

pushing a first pin 25 through the first wall 22, slot 62 on carrier 52, slot 62a on carrier 52' and the second wall 24 to loosely align the first ends 56,56' with the first end 18 of support member 12;

pushing a second pin 27 through the first wall 22, slot 62' on carrier 52, slot 62a' on carrier 52' and the second wall 24 to loosely align the second ends 58,58' with the second end 20 of support member 12;

obtaining a plurality of beams from a source with each beam being distinguished by a first end 76 with a circular opening 74 and a second end 79 with an elongated or oval opening 78 and an identical length.

placing a first beam 72a on the support member 12 and the first friction member 50 through the engagement of its circular opening 74 on bearing 30 of perpendicular projection 26 and its elongated opening 78 on bearing 60 of radial projection 54;

retaining the first beam 72a on the support member 12 and the first friction member 50 by respectively placing keepers 29 in corresponding slots 31 and 61;

placing a second beam 72b on the support member 12 and the first friction member 50 through the engagement of its circular opening 74 on bearing 30 of perpendicular projection 26' and its elongated opening 78 on bearing 60 of radial projection 54';

retaining the second beam 72b on the support member 12 and the first friction member 50 by respectively placing keepers 29 in corresponding slots 31 and 61 on projections 26' and 54';

placing a third beam 72c on the support member 12 and the second friction member 50' through the engagement of its circular opening 74 on bearing 30 of perpendicular projection 28 and its elongated opening 78 on bearing 60 of radial projection 54a;

retaining the third beam 72c on the support member 12 and the second friction member 50' by respectively placing keepers 29 in respective slots 31a and 61a on projection 28 and 54;

placing a fourth beam 72d, having a curved shape because of clearance needed with respect to the mounting support with the support member 13 on the vehicle, on the support member 12 and the second friction member 50' through the engagement of its circular opening 74 on bearing 30 of perpendicular projection 28' and its elongated opening 78 on bearing 60 of radial projection 54a';

retaining the fourth beam 72d on the support member 12 and the second friction member 50' by respectively placing keepers 29 in corresponding slots 31a' and 61a' on projections 28' and 54a';

attaching the support member 12 to a fixed member 13 by bolts that extend through holes 14, 14' to align the first side 22 and correspondingly the face of the first friction member 50 in a parallel plane with a first face 44a of a rotor 44 and the second side 24 and correspondingly the face of the second friction member 50' in a parallel plane with a second face 44b on rotor 44; and attaching a spreader spring 90 to the first 50 and second 50' friction members to urge the first 50 and second 50' friction members awy from the 44 and define a running clearance there between and complete an installation to a vehicle.

MODE OF OPERATION OF THE DISC BRAKE

Figure 5:
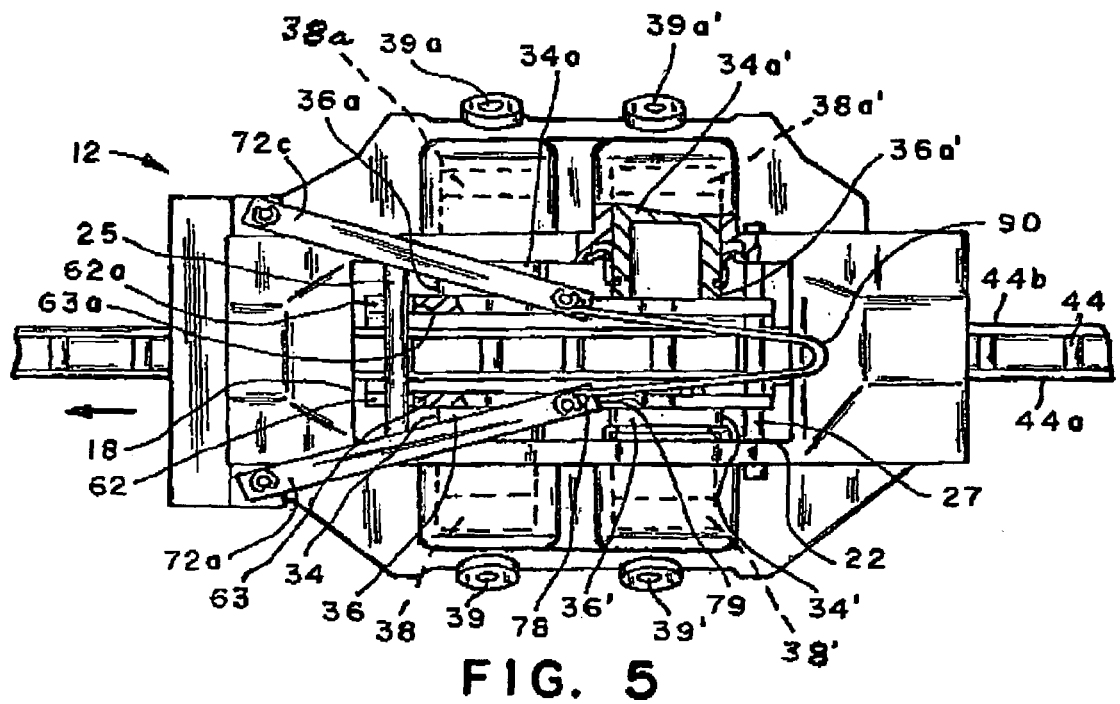
FIG. 5 is a sectional view of the disc brake of FIG. 1 during a brake application when the rotor and a vehicle are moving in a forward direction.

When a vehicle moving in a forward direction the rotor 44 rotates in a first direction and the components of the disc brake 10 are positioned as illustrated in FIGS. 2 and 3. When an operator desires to effect a brake application, pressurized fluid is supplied to actuation chambers 38,38',38a and 38a' that simultaneously acts on pistons 36,36', 36a, 36a' to produce an actuation force that moves the first friction member 50 into engagement with face 44a and the second friction member 50' into engagement with face 44b to retard the rotation of rotor 44 as illustrated in FIG. 5. As friction members 50 moves toward the rotor 44, beam 72a pivots on perpendicular projection 26 and beam 72b pivots on perpendicular projection 26' and at the same time friction members 50' moves toward the rotor 44, such that beam 72c pivots on perpendicular projection 28 and beam 72d pivots on perpendicular projection 28'. Engagement of the first friction member 50 with face 44a and the second friction member 50' with face 44b creates a reaction force that is carried into the first end 18 of support 12 by way of radial projection 54 and beam 72a, radial projection 54' and beam 72b, radial projection 54a and beam 72c and radial projection 54a' and beam 72d. Since the perpendicular projections 26, 26', 28 and 28' are offset from the radial projections 54, 54', 54a and 54a' the entire reaction force is not directly transmitted into the end member 18 but is modified by a component corresponding to the offset such that that component of the reaction force is added to the actuation force applied to effect a brake application as a servo action force. This servo action force theoretically would continue as a series. When the communication of pressurized fluid to chambers 38, 38'38a and 38a' terminates, spreader spring 90 returns the components to a position of rest as illustrated in FIGS. 2 and 3. In addition to being able to develop an actuation braking force equivalent to the prior art by using a smaller diameter for the actuation pistons, the wear of the first 50 and second 50' friction members for disc brake 10 should be more uniform (less taper wear) as the transmission of the reaction forces occurs through the centroidal axis of the carriers 52, 52'. Further, through the elimination of sliding friction associated with fixed head calipers of the prior art the pivoting action of the beams 72a,72b,72c and 72d of the disc brake 10 provides for a smooth actuation sequence in effecting a brake application.

Figure 6:
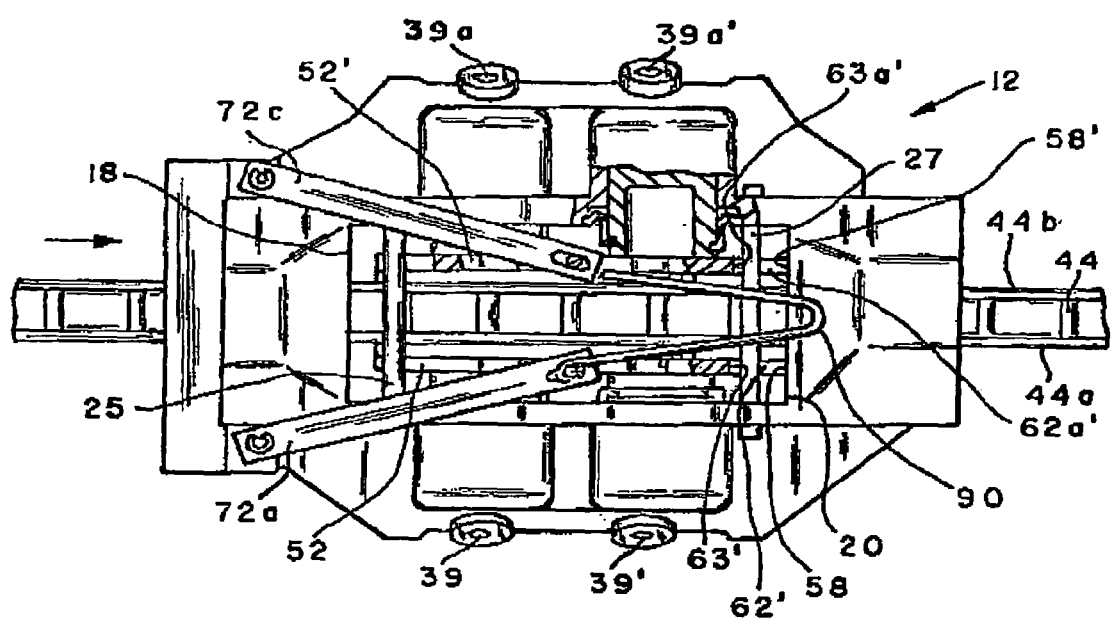
FIG. 6 is a sectional view of the disc brake of FIG. 1 during a brake application when the rotor and a vehicle are moving in a rearward direction.

When a vehicle moves in a rearward direction, the rotor 44 rotates in a second direction and the components of the disc brake 10 are initially positioned as illustrated in FIGS. 2 and 3. When an operator desires to effect a brake application, pressurized fluid is supplied to actuation chamber 38, 38', 38a and 38a' that simultaneously acts on pistons 36, 36', 36a and 36a' to produce an actuation force that moves the first friction member 50 into engagement with face 44a and the second friction member 50' into engagement with face 44b to retard the rotation of rotor 44 as illustrated in FIG. 6. As the friction members 50 moves toward the rotor 44, beam 72a pivots on perpendicular projection 26 and beam 72b pivots on perpendicular projection 26' and at the same time friction members 50' moves toward the rotor 44, beam 72c pivots on perpendicular projection 28 and beam 72d pivots on perpendicular projection 28'. Engagement of the first friction member 50 with face 44a and the second friction member 50' with face 44b creates a reaction force that translates the ends 58 of carrier 52 and 58' of carrier 52' into engagement with end 20 of support 12 to oppose the rotation of rotor 44. Movement of the carriers 52, 52' is possible since radial projection 54 moves in elongated slot or opening 78 in beam 72a; radial projection 54' moves in elongated slot or opening 78' in beam 72b; radial projection 54a moves in elongated slot or opening 78a in beam 72c; and radial projection 54a' moves in elongated slot or opening 78a' in beam 72d. The depth of slots 62 and 62a in carriers 52 and 52' is such the bottoms 63 and 63' never engage mounting pin 27 and as a result the entire reaction force is carried through the engagement of end 58 and 58a with a face on end 20 of the support member 12.

When a vehicle in moving in reverse direction, the additive advantage of the servo action is available but is has been determined that over 98 present of braking occurs when a vehicle is traveling in a forward direction. It has been suggested that a reduction in actuation force for braking may be beneficial as it is common for the front wheels to lock under certain actuation situations. Such a reduction could be achieved if the elongated opening in the beams were changed to a circular opening to establish a solid link with the perpendicular projections on the first end of the caliper housing. With this change, instead of the servo force being additive a component of the reaction force would subtracted from the actuation force and as a result the corresponding braking force would be reduced in effecting a brake application for a vehicle traveling in a reverse direction.

What is claimed is:

1. A disc brake comprising:
   a support member having a substantially rectangular body with a corresponding rectangular opening to define a first end that is separated from a second end by parallel first and second side walls, said first end having first and second perpendicular projections thereon aligned with said first wall and third and fourth perpendicular projections thereon aligned with said second wall, said support member being fixed to a housing of a vehicle to locate said first and second walls in parallel alignment corresponding first and second faces on a rotor, said first wall having a first bore for receiving a first piston to define a first chamber, said second wall having a second bore for receiving a second piston to define a second chamber;
   a first friction member having a first carrier plate with a first radial projection and a second radial projection thereon located mid-way between a first end and a second end;
   a second friction member having a second carrier plate with a third radial projection and a fourth radial projection thereon located mid-way between a first end and a second end; and
   linkage means for connecting said first projection on said first friction member with said first perpendicular projection on said support member, second projection on said first friction member with said second perpendicular projection on said support member, said third projection on said second friction member with said third perpendicular projection on said support member and said fourth projection on said second friction member with said fourth perpendicular projection to align said first friction member adjacent said first piston and said second friction member adjacent said second piston such that on presentation of pressurized fluid to said first and second chambers said first and second piston an actuation force is created to simultaneously move said first friction member into engagement with said first face on said rotor and second friction member into engagement with said second face on said rotor to effect a brake application.

2. The disc brake as recited in claim 1 wherein with engagement of said first friction member with said first face and said second friction member with said second face a reaction force is created that is carried into said first end through said linkage means.

3. The disc brake as recited in claim 2 wherein a portion of said reaction force is added to said actuation force to effect the brake application.

4. The disc brake as recited in claim 3 wherein said portion of said reaction force that is added is a function of a distance that said first and second perpendicular projections on said first end are off set from said first and second radial projections on said first carrier and said third and fourth perpendicular projections on said first end are off set from said third and fourth radial projections on said second carrier.

5. The disc brake as recite in claim 4 further including;
spring means connected to said first carrier member and said second carrier member to urging said first and second friction members away from said rotor.

6. The disc brake as recited in claim 5 wherein said linkage means is characterized by a plurality of beams each of which have a first end and a second end with the first end having a circular opening to define a pivot through which the reaction force is transmitted into said first end and with the second end having an oval opening through which the reaction force is transmitted from the carrier members when the rotor is rotating in a first direction and into said second end by way of the second end of said carriers when the rotor is rotating in a second direction.

7. The disc brake as recited in claim 6 wherein said first and second carrier members are each characterized by an axial slot adjacent said first end through which a shaft extends from said first side wall to said second side wall to assist in maintaining said first and second friction member in radial alignment with respect to said rotor.

8. The disc brake as recited in claim 7 wherein said axial slot has a depth such that carrier members do not engage said shaft and thereby affect the transmission of the reaction force into the linkage means.

9. A disc brake comprising:
a support member having a substantially rectangular body with a corresponding rectangular opening to define a first end that is separated from a second end by parallel first and second side walls, said first end having first and second perpendicular projections thereon aligned with said first wall and third and fourth perpendicular projections thereon aligned with said second wall, said support member being fixed to a housing of a vehicle to locate said first and second walls in parallel alignment corresponding first and second faces on a rotor, said first wall having a first plurality of bores for receiving a first plurality of piston to define a first plurality of chambers, said second wall having a second plurality of bores for receiving a second plurality of pistons to define a second plurality of chambers, said first and second plurality of chambers being connected to receive pressurized fluid from a source;
a first friction member having a first carrier plate with a first radial projection and a second radial projection thereon located mid-way between a first end and a second end;
a second friction member having a second carrier plate with a third radial projection and a fourth radial projection thereon located mid-way between a first end and a second end; and
linkage means including a first beam for connecting said first projection on said first friction member with said first perpendicular projection on said support member, a second beam for connecting second projection on said first friction member with said second perpendicular projection on said support member, a third beam for connecting said third projection on said second friction member with said third perpendicular projection on said support member and a fourth beam for connecting said fourth projection on said second friction member with said fourth perpendicular projection on said support member to align said first friction member adjacent said first piston and said second friction member adjacent said second piston such that on presentation of pressurized fluid to said first and second plurality of chambers and act on said first and second plurality of pistons to create an actuation force and simultaneously move said first friction member into engagement with said first face on said rotor and second friction member into engagement with said second face on said rotor to effect a brake application.

10. The disc brake as recited in claim 9 wherein movement of said first friction member into engagement with said first face cause said first beam to pivot on said first perpendicular projection and said second beam to pivot on said second perpendicular projection and movement of said second friction member into engagement with said second face cause said third beam to pivot on said third perpendicular projection and said fourth beam to pivot on said fourth perpendicular projection such that a first portion of a reaction force created through the engagement is added to the actuation force rather than being transmitted into said first end.

11. The disc brake as recited in claim 10 wherein said first portion of said reaction force is a function of a distance that said first and second perpendicular projections on said first end are off set from said first and second radial projections on said first carrier and said third and fourth perpendicular projections on said first end are off set from said third and fourth radial projections on said second carrier.

12. The disc brake as recite in claim 11 further including;
spring means connected to said first carrier member and said second carrier member to urging said first and second friction members away from said rotor.

13. The disc brake as recited in claim 12 wherein said first beam, second beam, third beam and fourth beam each have a circular opening in a first end and an oval opening in a second end such that pivoting occurs in said circular opening when engagement occurs with the rotor and when the rotor is rotating in a first direction the reaction force is transmitted into the first end of said support member through the pivot connection while said oval opening allows said first and second carriers to translate into engagement with said second end of said rectangular body of said support member on engagement of said friction members with the rotor when the rotor is rotating in a second direction such that a reaction force is directly transmitted through said second end of the first and second carriers into said support member.

14. The disc brake as recited in claim 13 wherein said first and second carrier members are each characterized by an axial slot that is located adjacent said first end through which a shaft extends from said first side wall to said second side wall to assist in maintaining said first and second friction member in radial alignment with said rotor.

15. The disc brake as recited in claim 14 wherein said axial slot has a depth such that said first and second carrier members do not engage said shaft on rotation of said rotor in the first direction and as a result communication of a reaction force only occurs through said first, second, third and fourth beams.

16. A disc brake having a support member with a substantially rectangular body defined a first end that is separated from a second end by parallel first and second side walls and attached to a housing to align the first and second side walls with a rotor, said first and second side wall retaining actuations means that act on first and second frictions members in response to an operator input to move the first and second friction members into engagement with the rotor to effect a brake application, said rectangular body being characterized by first and second perpendicular projections that extend from said first end and are aligned with said first wall and third and fourth perpendicular projections that extend from said first end and are aligned with said second wall; and wherein said first and second friction members are respectively characterized by carrier plates having a first radial projection and a second radial projection located mid-way between a first end and a second end; and wherein said first and second friction members are aligned with the rotor by a first beam that connects said first projection on said first friction member with said first perpendicular projection on said support member, a second beam that connects second projection on said first friction member with said second perpendicular projection on said support member, a third beam that connects said first projection on said second friction member with said third perpendicular projection on said support member and a fourth beam that connects said second projection on said second friction member with said fourth perpendicular projection on said support member to align said first friction member and said second friction member adjacent said actuation means such that said first and second beams pivot on said first and second perpendicular projections and said third and fourth beams pivot on said third and fourth perpendicular projections as said first and second carriers are moved with respect to said rotor by an actuation force from the actuation means in effecting a brake application.

17. The disc brake as recited in claim 16 further characterized in that on engagement of said first and second friction members with said rotor a reactions force is created and transmitted into said first, second, third and fourth beams to resist rotation of said rotor, said such that a portion thereof is redirected and added to the actuation force during a brake application.

* * * * *